United States Patent
Schubert et al.

(10) Patent No.: US 12,405,370 B2
(45) Date of Patent: Sep. 2, 2025

(54) METHOD FOR RADAR-BASED MONITORING OF A REARWARD AREA

(71) Applicant: Robert Bosch GmbH, Stuttgart (DE)

(72) Inventors: Eugen Schubert, Benningen Am Neckar (DE); Martin Stolz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 17/902,676

(22) Filed: Sep. 2, 2022

(65) Prior Publication Data

US 2023/0095698 A1 Mar. 30, 2023

(30) Foreign Application Priority Data

Sep. 27, 2021 (DE) .................... 10 2021 210 738.9

(51) Int. Cl.
*G01S 13/931* (2020.01)
*G01S 7/295* (2006.01)

(52) U.S. Cl.
CPC .......... *G01S 13/931* (2013.01); *G01S 7/2955* (2013.01); *G01S 2013/9327* (2020.01)

(58) Field of Classification Search
None
See application file for complete search history.

(56) References Cited

U.S. PATENT DOCUMENTS

| | | | |
|---|---|---|---|
| 2016/0041258 A1 | 2/2016 | Cashler et al. | |
| 2020/0346653 A1* | 11/2020 | Kondo | G01S 13/08 |
| 2024/0239367 A1* | 7/2024 | Herman | G06V 20/56 |

FOREIGN PATENT DOCUMENTS

| | | | |
|---|---|---|---|
| DE | 102005044485 B4 | 12/2007 | |
| DE | 102012108023 A1 | 5/2014 | |
| JP | 2003532959 A | * 11/2003 | .......... G01S 7/4802 |
| WO | 2020252227 A1 | 12/2020 | |

OTHER PUBLICATIONS

Roos, et al.: "Ghost Target Identification by Analysis of the Doppler Distribution in Automotive Scenarios,", The 18th International Radar Symposium (IRS 2017) pp. 1-9, Prague, Czech Rep., ISBN 978-3-7369-9343-3.

Qiu, et al.: "Multipath Model and Ghosts Localization in Ultra-wide Band Virtual Aperture Radar," Proceedings of 12th International Conference on Signal Processing (ICSP 20140, pp. 2149-2152, ISBN 978-1-4799-2188-1.

\* cited by examiner

*Primary Examiner* — Vladimir Magloire
*Assistant Examiner* — Brandon James Henson
(74) *Attorney, Agent, or Firm* — NORTON ROSE FULBRIGHT US LLP

(57) ABSTRACT

A method for radar-based monitoring of a rearward area of a truck. The truck comprises a radar device and at least one semitrailer. The method comprises the steps of ascertaining various objects and their position using the radar device, determining an alignment of the trailer relative to the radar device, determining the objects that, based on their position, are concealed for the radar device as a result of the alignment of the semitrailer, and ascertaining, on the basis of the alignment of the semitrailer and an ascertained reflection of the radar waves on the semitrailer, the true position of the objects ascertained as concealed.

9 Claims, 2 Drawing Sheets

METHOD FOR RADAR-BASED MONITORING OF A REARWARD AREA

CROSS REFERENCE

The present application claims the benefit under 35 U.S.C. § 119 of German Patent Application No. DE 10 2021 210 738.9 filed on Sep. 27, 2021, which is expressly incorporated herein by reference in its entirety.

FIELD

The present invention relates to a method for radar-based monitoring of a rearward area of a truck. In addition, the present invention relates to a device for carrying out such a method.

BACKGROUND INFORMATION

For driver assistance systems, such as blind-spot monitoring, radar-based systems are now often used in order to better monitor a vehicle environment. Radar-based systems have the disadvantage that the radar waves are reflected on objects so that multipath propagation of the radar waves occurs. As a result, objects can be assigned to a location where they are not, so that so-called virtual ghost objects occur. Due to the large lateral reflecting surface of a semitrailer, this applies in particular to driver assistance systems of trucks. This can lead to incorrect decisions of the driver assistance system.

German Patent Application No. DE 10 2012 108 023 A1 describes a method for the radar-based identification of roadside structures by utilizing multipath propagation of radar beams. In the method, two target objects are, for example, ascertained by means of the radar. If a comparison of the two target objects results in an identity, one target object is deduced to be a reflection. On the basis of this reflection, the roadside structure is detected.

SUMMARY

An object of the present invention is to provide a method for radar-based monitoring of a rearward area of a truck, which method is more robust with regard to erroneous detections.

The object may be achieved by a method having the features of the present invention. In addition, the present invention provides a device for carrying out such a method, the device having the features of the present invention. Preferred embodiments of the present invention are disclosed herein.

The present invention provides a method for radar-based monitoring of a rearward area of a truck. The truck comprises a radar device and at least one semitrailer. The method comprises various steps. According to an example embodiment of the present invention, in a first step, various objects and their position are ascertained by means of the radar device. Objects in the sense of the present invention are understood to mean all moving or stationary objects detectable by means of a radar device. Here, road users or obstacles are preferably detected in the traffic area. The position of the objects is ascertained from the direction and the transit time of the reflected radar beams.

In the next step, an alignment of the semitrailer relative to the radar device is determined. The alignment of the trailer indicates how a longitudinal side of the semitrailer arranged on the side of the radar device is arranged relative to the radar device. The alignment is preferably determined as an angle and intersection point of a longitudinal side axis of the semitrailer with respect to a longitudinal axis of the tractor.

In addition, the objects that, based on their position, are concealed for the radar device as a result of the alignment of the semitrailer are determined. There is thus no direct connection between the radar device and this object. Such an object is thus located in a radar shadow of the semitrailer. It is thus deduced that this object could not have been detected in this way, and therefore it must be a virtual object.

In a subsequent step, the true position of the objects ascertained as concealed is ascertained on the basis of the alignment of the semitrailer and an ascertained reflection of the radar waves on the trailer. The virtual objects are thus mirrored on the longitudinal side of the semitrailer. It is thus possible to detect and exclude erroneous detections of objects as a result of multipath propagation. This improves the detection of true objects. In particular, when the same object is detected several times, the detected object properties, such as contour, extension or object type of the object, can be improved. In addition, by ascertaining the true objects, it is possible to detect objects that could not have been detected based on their position relative to the radar device. The detection of objects is thus improved with this method and the number of detected objects is increased.

In a preferred embodiment of the present invention, the alignment of the semitrailer relative to the radar device is ascertained by evaluating odometry data of a tractor of the truck and static parameters of the semitrailer. The static parameters here include values relating to the dimensions of the semitrailer and to the position of the kingpin of the semitrailer relative to the radar device. These values are constant during travel. Odometry here comprises a method of estimating the position and orientation of a mobile system on the basis of the data of its propulsion system. The data can include the steering angle of the tractor. Since these values are ascertained by default, there is no need to provide additional apparatuses with which alignment is ascertained. On the basis of these data, the alignment of the semitrailer can thus be ascertained easily and economically.

Alternatively, sensors with which an angle between the tractor and the semitrailer is ascertained may be provided. The sensors may be provided in the region of the kingpin. A distance sensor between the tractor and the semitrailer may likewise be provided, via which distance sensor a corresponding angle of the semitrailer can be ascertained if there is a change in distance. The alignment of the semitrailer can be ascertained even more precisely via such sensors.

In a further preferred example embodiment of the present invention, the alignment of the semitrailer is determined via radar detection. The reflected radar beams are detected during the determination. The position of the longitudinal side of the semitrailer is ascertained using these beams. With this method, no further apparatuses are thus required in order to detect the alignment of the semitrailer relative to the tractor. As a result, the alignment of the semitrailer relative to the tractor can be easily and economically detected.

Preferably, the semitrailer is detected on the basis of the relative speed of the semitrailer with respect to the tractor so that the radar values of which the relative speed is zero are assigned to the semitrailer. According to this method, an object is thus detected as the semitrailer only if it has the same speed as the tractor. Since other objects generally have a relative speed with respect to the truck, erroneous assignments as a result of other objects are avoided. The detection of the semitrailer is thus improved and errors are prevented.

In addition, other objects are detected more easily based on their relative speed with respect to the tractor. This improves the detection of objects.

In an alternative embodiment of the present invention, the semitrailer may be detected on the basis of its shape and the detected radar reflections so that the position of the semitrailer can be determined therefrom.

In an advantageous development of the present invention, the measurement is carried out by using an FMCW (Frequency-Modulated Continuous Wave) radar device. FMCW radars often operate with periodic frequency modulation. By suitably selecting the frequency modulation, high distance accuracy can be achieved at a short distance. As a result, the position of the objects can be ascertained with high accuracy. In a further alternative, the measurement is carried out by means of an OFDM (Orthogonal Frequency-Division Multiplexing) radar device.

The ascertained objects are advantageously transmitted to a driver assistance system. The driver assistance system may, for example, be a parking assistance system or a blind-spot monitoring system. On the basis of the ascertained data about the objects, the driver assistance system is able to react in a more error-free fashion. The functionality of the driver assistance system is likewise increased by the improved detection of objects.

The object on which the present invention is based is additionally achieved by a device for carrying out the method according to the present invention. The device comprises a radar device comprising at least one radar sensor, and a computing unit for calculating the true position of the object. With such a device, the advantages mentioned regarding the method are substantially achieved.

In an advantageous example embodiment of the present invention, the radar device is arranged on at least one exterior mirror of the truck. An exterior mirror projects laterally beyond an outer longitudinal side of the semitrailer. As a result, the longitudinal side of the semitrailer can still be detected even when the semitrailer is at an angle turned away from the radar device. Detection of objects and of the longitudinal side of the semitrailer is thus improved.

Exemplary embodiments of the present invention are illustrated in the figures and explained in more detail in the following description.

DETAILED DESCRIPTION OF EXAMPLE EMBODIMENTS

Figure 1:
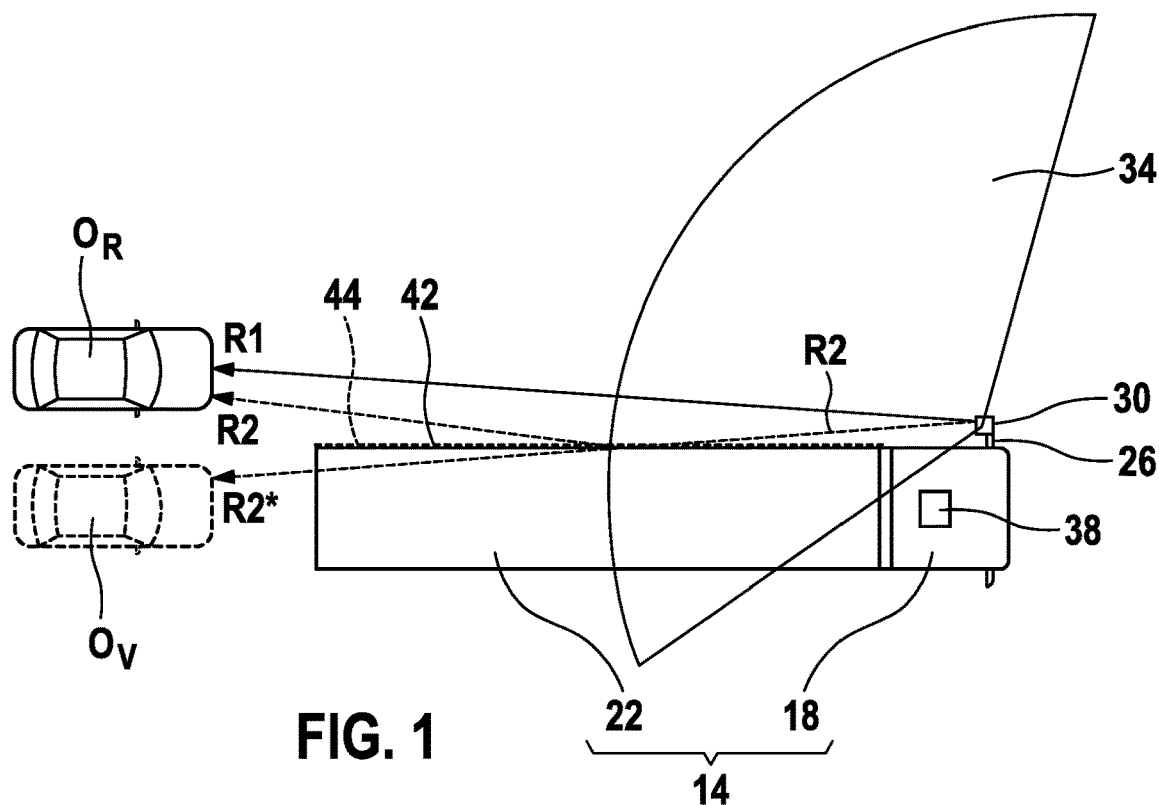
FIG. 1 shows a first exemplary embodiment of the present invention.

FIG. 1 shows a first exemplary embodiment of the present invention. This figure shows a truck 14 which has a tractor 18 and a semitrailer 22 arranged behind the tractor 18. In this exemplary embodiment, a radar device 30, which has a radar sensor, is arranged on an exterior mirror 26 of the tractor 18. The radar device 30 substantially monitors a rearward area of the truck 14, as is illustrated by the field of vision 34 of the radar device 30 shown in the figure. In order to evaluate the radar results, a computing unit 38 is arranged in the tractor 18.

The figure furthermore shows two objects $O_R$, $O_V$ detected by the radar device 30, which objects are here shown as cars. In this case, the object $O_R$ is a real object which has been detected via the radar wave R1. The object $O_V$, on the other hand, is a virtual object, which, due to the course of radar beam R2 assumed to be the radar beam shown as R2* is detected behind the semitrailer 22. The longitudinal side 42 of the semitrailer 22 arranged on the side of the radar device 30 here forms a mirror plane 44 for the radar beam R2. As a result, the radar beam R2 is reflected on the longitudinal side 42 of the semitrailer 22. The radar beam R2 therefore does not travel as radar beam R2* as assumed. The radar beam R2 thus likewise detects the object $O_R$.

Based on the position of the virtual object $O_V$ and of the semitrailer 22, it is recognized in computing unit 38 that this object $O_V$ could not have been detected since it is concealed by the semitrailer 22. In order to ascertain the true position of the object $O_V$, the computing unit 38 ascertains the alignment of the mirror plane 44 formed by the semitrailer 22. The real object $O_R$ is subsequently determined by a reflection on the longitudinal side 42 of the semitrailer 22 so that erroneous measurements can thereby be eliminated.

Figure 2:
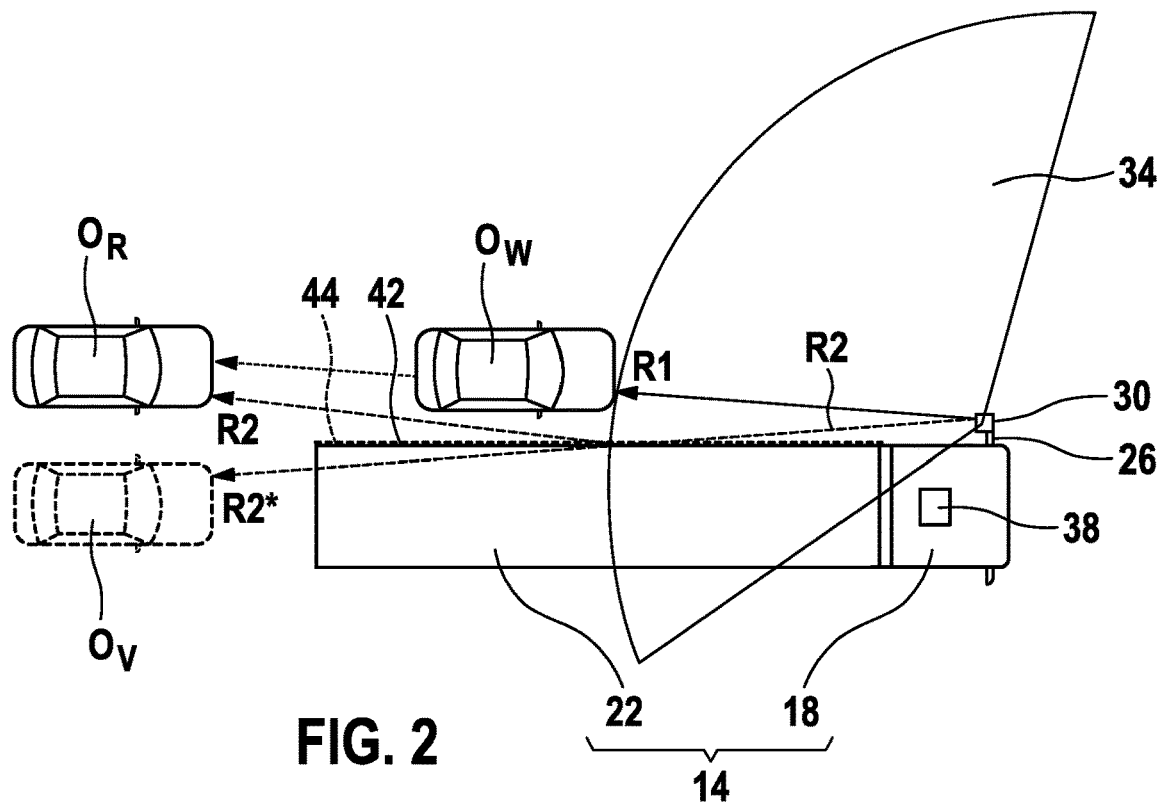
FIG. 2 shows a second exemplary embodiment of the present invention.

FIG. 2 shows a second exemplary embodiment of the present invention. In this exemplary embodiment too, a virtual object $O_V$, which is located behind the semitrailer 22 and thus not visible to the radar device 30, is ascertained. In this exemplary embodiment, direct detection of the associated real object $O_R$ by means of a radar wave R1 is not possible since the real object $O_R$ is concealed for the radar wave R1 by a further object $O_W$. Here too, the computing unit 38 recognizes that the object $O_V$ is not a real object $O_R$ since it is located behind the semitrailer 22. Based on the alignment of the semitrailer 22 and the reflection on the longitudinal side 42, the computing unit 38 thus calculates the real position of the object $O_R$.

As a result of this procedure, it is possible to detect objects $O_R$ that normally could not have been detected by the radar device 30. As a result, the detection of objects $O_R$ is improved.

Figure 3:
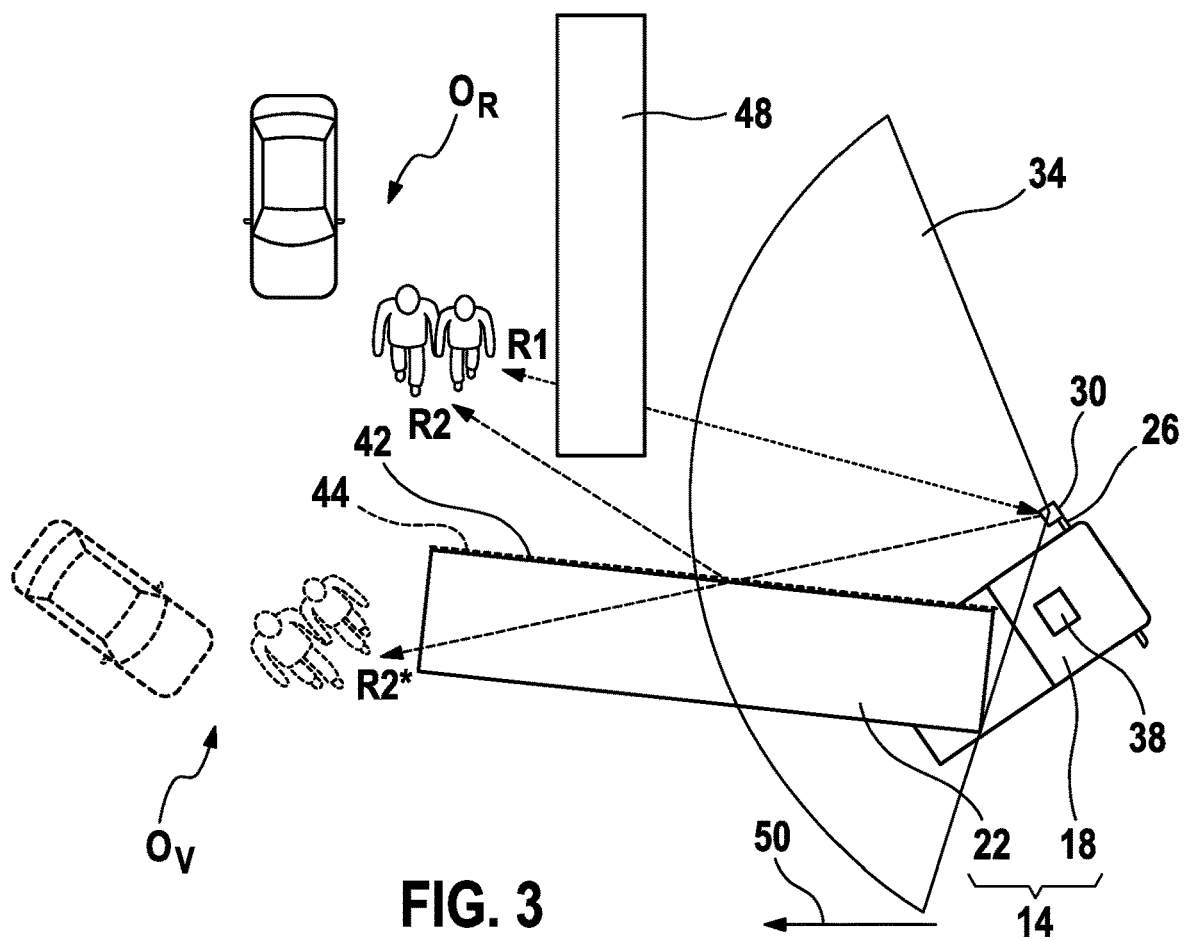
FIG. 3 shows a third exemplary embodiment of the present invention.

FIG. 3 shows a third exemplary embodiment of the present invention. A concealment 48 is shown in this figure. This concealment 48 may be another truck, a wall or the like. As a result, it is impossible to detect the objects $O_R$ directly with the radar waves R1. Here, the truck 14 is engaged in a parking maneuver with the aim of parking in a rearward direction 50 next to the concealment 48. Here too, the longitudinal side 42 of the semitrailer 22 serves as a mirror plane 44. The computing unit 38 recognizes here that the objects $O_V$ ascertained behind the trailer 22 are virtual objects and calculates the real position of the objects $O_R$ based on a reflection on the longitudinal side 42 of the semitrailer 22. As a result, detection in a non-visible region is improved.

Figure 4:
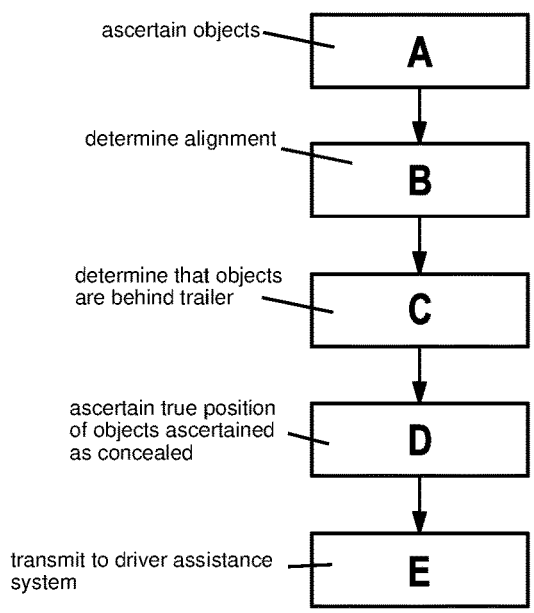
FIG. 4 shows an exemplary embodiment of the method according to the present invention.

FIG. 4 shows an exemplary embodiment of the method according to the present invention for radar-based monitoring of a rearward area of a truck 14. In a first step A, various objects $O_R$, $O_V$, such as cars, pedestrians or cyclists are ascertained in the rearward area by means of the radar device 30. In a next step B, the alignment of the semitrailer 22 relative to the radar device 30 is determined. This is ascertained, for example, by means of the odometry data of the tractor 38 and the static parameters of the semitrailer 22, such as the width of the semitrailer 22 and the distance from the tractor 18. Subsequently, in a next step C, the objects $O_V$ that, based on their ascertained position and the alignment of the trailer 22, are behind the trailer 22 are determined. The radar device 30 would thus actually not be able to ascertain these objects $O_V$.

In step D, the true position is ascertained for the objects $O_V$ ascertained as concealed. For this purpose, a reflection of the radar waves on the semitrailer 22 is calculated on the basis of the ascertained alignment of the semitrailer 22. In this case, the true object $O_R$ corresponds to an object $O_V$ mirrored on the mirror plane 44 formed by the longitudinal side 42 of the semitrailer 22. The thus ascertained true position of the object $O_R$ is subsequently transmitted in step E to a driver assistance system for further evaluation.

What is claimed is:

1. A method for radar-based monitoring of a rearward area of a truck, the truck including (I) a cabin on which a radar device is installed and (II) a semitrailer connected to the cabin, the method comprising the following steps:
   ascertaining presence of an object and an initial determined position of the object using the radar device;
   determining an alignment of the semitrailer relative to the radar device;
   determining that the object whose presence has been ascertained is likely at least partially concealed by the semitrailer from the radar device;
   determining, based on the determined position of the semitrailer relative to the radar device, an expected reflection behavior of radar waves reflected by the semitrailer to the radar device; and
   correcting, based on the determined expected reflection behavior of radar waves reflected by the semitrailer, the initial determined position to a true position of the object.

2. The method according to claim 1, wherein the alignment of the semitrailer relative to the radar device is ascertained by evaluating odometry data of the cabin of the truck and static parameters of the semitrailer.

3. The method according to claim 1, wherein the alignment of the semitrailer is determined via radar detection.

4. The method according to claim 3, wherein the alignment of the semitrailer is detected based on a relative speed of the semitrailer relative to the cabin so that radar values of which the relative speed is zero are assigned to the semitrailer.

5. The method according to claim 1, the radar device is an FMCW radar device.

6. The method according to claim 1, wherein the true position of the object is transmitted to a driver assistance system.

7. A device for radar-based monitoring of a rearward area of a truck, the truck including (I) a cabin on which a radar device is installed and (II) a semitrailer connected to the cabin, the device comprising:
   the radar device including at least one radar sensor; and
   a computing unit;
   wherein the computing unit is configured to:
      ascertain presence of an object and an initial determined position of the object using the radar device;
      determine an alignment of the semitrailer relative to the radar device;
      determine that the object whose presence has been ascertained is likely at least partially concealed by the semitrailer from the radar device;
      determine, based on the determined position of the semitrailer relative to the radar device, an expected reflection behavior of radar waves reflected by the semitrailer to the radar device; and
      correct, based on the determined expected reflection behavior of radar waves reflected by the semitrailer, the initial determined position to a true position of the object.

8. Device according to claim 7, wherein the radar device is arranged on at least one exterior mirror of the truck.

9. The method according to claim 1, wherein the determination of the alignment of the semitrailer relative to the radar device is based on the radar waves reflected by the semitrailer to the radar device.

* * * * *